United States Patent Office 3,384,697
Patented May 21, 1968

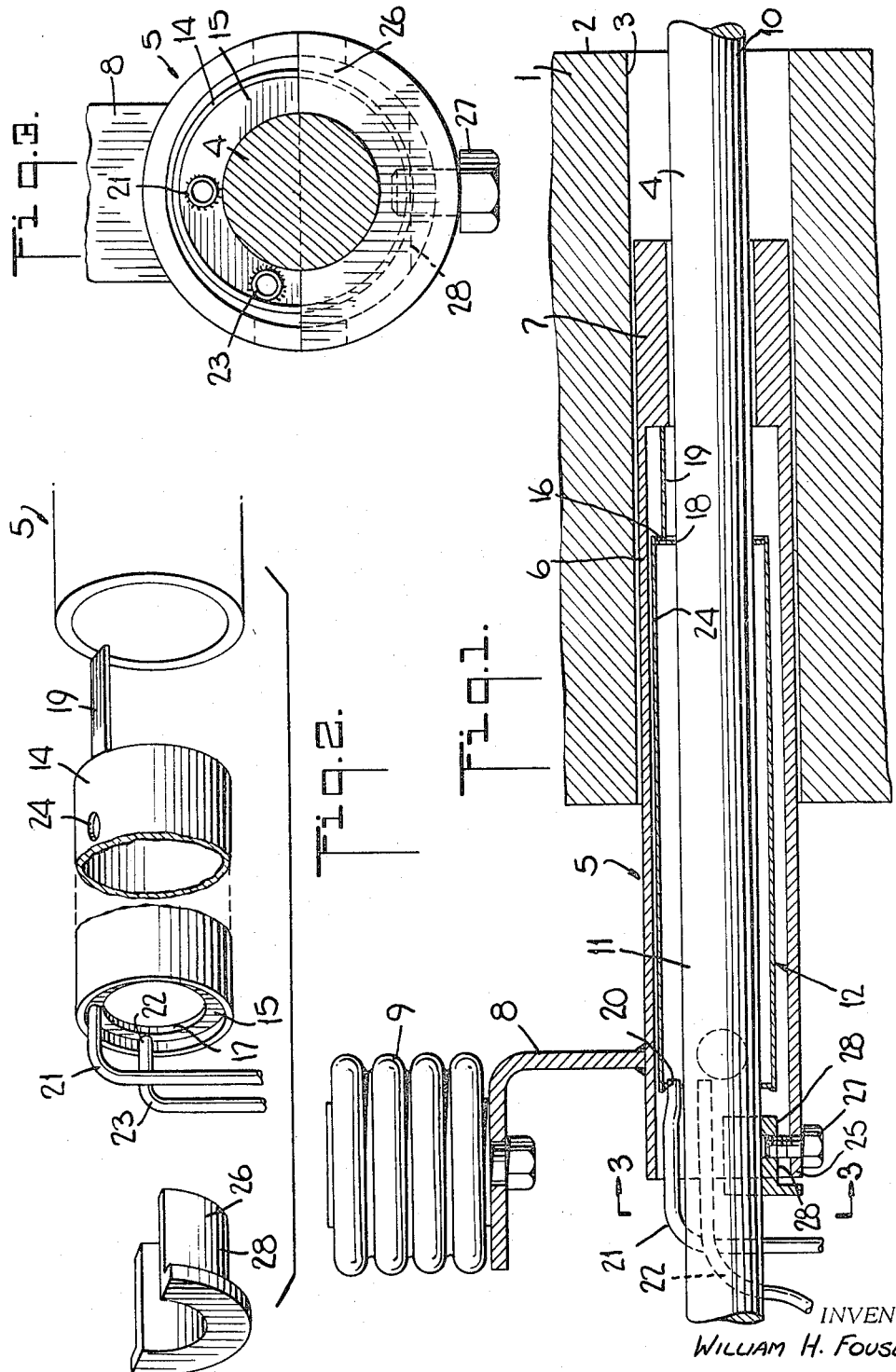

3,384,697
LIQUID-COOLED HOLDER FOR FURNACE ELECTRODE
William H. Fouse, Lancaster, Ohio, assignor to Anchor Hocking Glass Corporation, Lancaster, Ohio, a corporation of Delaware
Filed Mar. 10, 1966, Ser. No. 533,364
6 Claims. (Cl. 13—6)

The present invention relates to glass furnaces and more particularly to an improved liquid cooled holder for mounting electrodes in the walls of glass furnaces.

The melting of batch materials during glass manufacture in the large glass melting tanks has been found to be facilitated by a combination of flame heating and electric heating as described for example in United States Patent No. 2,767,232 owned by the assignee of the present invention. This addition of electric heating to the flame heating is known as electric booster melting and requires the use of metal electrodes which are mounted in the furnace walls to pass the electric heating currents into the glass melt. These electrodes which are most often formed of molybdenum comprise elongated rods which are supported in the furnace walls so that they extend into the glass melt a short distance.

Since the end portions of these electrodes which are in contact with the hot melted glass continually deteriorate, it is necessary to periodically advance the electrodes forward into the furnace. The hot melted glass also increases the temperature of the electrodes themselves and this heat is transferred from the inner end portions outwardly along the rods to the outer portions which extend outwardly of the furnace walls and which are exposed to the air.

It has therefore been found desirable to minimize the oxidation of these portions of the electrodes which are exposed to the air by liquid cooling them and maintaining their temperature below the oxidation temperature of the molybdenum or other metal. It has been proposed that this cooling be done by forming the electrode mountings in the form of hollow jackets through which a cooling liquid such as water may be continually passed. Such a jacket, for example, is illustrated in the above mentioned patent where an elongated holder having a central bore for the electrodes also includes a hollow water jacket.

It has also been proposed that the electrode be cooled by directing a jet or spray of water directly against the exposed portions of the electrode without confining this cooling water within a jacket.

Difficulties have been encountered in both the above proposed methods. Where water jackets have been used which surround the electrodes and which act as a combined support and cooling device, it has been found difficult to provide the necessary periodic advancement of the rods into the furnace as the rods tended to become bonded to the water jacket aperture. In addition, the water jacket itself has been found to become less and less effective during its life as impurities found in the normal cooling water supplies have built up on the inner walls of the jackets. This has required the use of supports with reduced efficiency or has required a periodic relatively difficult and expensive replacement of the electrode supports.

Not only is this replacement difficult and expensive but it is also impractical during furnace operation so that the replacement activities are limited to the time periods between melts.

The direct cooling of the electrodes by jets or sprays of water while permitting a reduction in electrode support area and also minimizing the problem of impurity build-up has been found to provide less than adequate cooling in many cases and has also been found to require continuing adjustment in properly controlling the electrode temperature.

The present invention overcomes the above problems by employing a novel replaceable and relatively loose fitting water jacket easily applied to and removed from the electrodes without disturbing the rod position and capable of maintaining a desired coolant flow. The jackets are relatively simple to manufacture from inexpensive material.

Accordingly, an object of the present invention is to provide an improved electrode holder for glass furnaces.

Another object of the present invention is to provide an improved electrode holder which is easily replaceable and inexpensive.

Another object of the present invention is to provide an improved electrode holder which is highly efficient and which has improved temperature controlling capabilities.

Another object of the present invention is to provide an improved electrode cooling jacket which is removable independently of the main electrode holder.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a vertical sectional view of the electrode holder mounted in a furnace wall and holding an electrode in position;

FIG. 2 is an exploded perspective partially cut away of the improved cooling element; and FIG. 3 is a vertical sectional view taken along line 3—3 of FIG. 1.

In the drawings a typical furnace wall is illustrated at 1 having an inner surface 2 and an aperture 3 to permit a metal electrode 4 to be inserted into the furnace. The electrode 4 is used to feed an electric current which in the case of a glass furnace is a current used for additional or booster melting where the regular flame heating is supplemented by the additional electric heating.

The electrode 4 is mounted in a holder 5 which comprises a hollow cylindrical outer casing 6 terminating at its inner end in an enlarged electrode collar portion 7 shaped to slidably engage and support the electrode 4. The holder 5 includes a bracket 8 which positions and supports the outer end of the holder by means of a suitable electric insulator 9 which is attached either to the furnace or to an adjacent suitable support means.

Since the inner portion 10 of the electrode 4 is in contact with the hot molten glass, the temperature of the electrode 4 itself tends to rise to the temperature of the molten glass and this extremely high temperature is conducted along the electrode to the outer portion 11 which is normally in contact with the air and which is thus subject to oxidation at the elevated temperature.

An improved light-weight and removable cooling jacket in accordance with the present invention is illustrated at 12. This jacket 12 comprises a thin outer wall 14 which may be a section of stainless steel tube and a pair of end rings or collars 15 and 16 having center apertures 17 and 18 for passing the electrode 4. The apertures 17 and 18 are proportioned to having a sliding fit with the electrode 4 thereby permitting the jacket to be easily applied or removed from the electrode and replaced when necessary and also to permitting free advancement of the electrode 4 with respect to the jacket 12 when it is necessary to advance the electrode through the collar 7 into the furnace during the periodic adjustments of the electrode position. A small amount of water around the relatively loose fitting between the collar 15 and 16 and the electrode 4 may occur and is unobjectionable. A spacer 19 is provided to position the inner collar 18 of the jacket 12 a short distance from the holder collar 7. The outer jacket collar 15 is provided with a pair of spaced apertures including an upper aperture 20 for receiving a water inlet tube 21 and a lower aperture 22 into which is coupled a suitable drainage tube 23. The drainage aperture 22 is preferably positioned slightly above the centerline of the electrode 4 to assure that a substantial portion of the electrode 4 is in contact with the cooling water at all times regardless of the water delivery rate through the water supply tube 21.

A relief hole 24 is provided in the top of the jacket to act as an overflow outlet to prevent a pressure rise in the water within the jacket 12. Water flowing out of the relief hole 24 and through the openings between the electrode and collars 15 and 16 drains through the open outer end 25 of the holder. A flanged electrode support 26 is preferably attached to the outer end 25 to the electrode holder by a suitable bolt 27 and it has a cut away portion 28 which permits water to flow underneath it and out of the holder 5.

The above described removable water jacket is conveniently made of relatively thin corrosion resistant metal such as, for example, stainless steel plate with the outer cylindrical portion cut 12 from stainless steel tubing of the proper diameter. It is thus clear that a relatively inexpensive and effective water jacket has been provided which is easily installed and removed. As indicated above, replacement of these water jackets 12 from time to time has been found desirable due to the tendency of deposits to build up within the jackets thereby reducing their cooling volume and their effectiveness.

The outer holder 6 may be permanently fastened in the furnace wall 1 and normally will last for the life of the furnace itself with replacement being only necessary for the removable water jacket 12 described above.

The water jacket 12 is simply slipped off of the outer end of the electrode 4 when the support 26 is removed by removal of the bolt 27 and after the electrical connections are removed from the outer end of electrode 4. Short sections of the tubes 21 and 23 may be welded to the jacket 12 or the tubes 21 and 23 may be frictionally or otherwise removably attached to the jacket 12.

It will be seen that an improved cooling means has been provided for furnace electrodes such as those used in glass furnaces having electric or electric booster heating. By being inexpensive and readily replaceable, the jackets permit full advantage to be taken of the full circulation of the cooling water. No particular purification of the cooling water is necessary since the cooling jackets themselves are inexpensive and easy to replace from time to time as deposits build up in the jackets.

It is also clear that an electrode cooling means has been provided which does not interfere with the necessary periodic adjustment of the electrode positions in the furnace walls, since the jackets themselves are easily slipped over the electrodes and the electrodes themselves are readily moved with respect to the jackets to that the electrodes may be advanced with the jackets in place in their cooling position.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described by invention, I claim:

1. An electrode assembly for an apertured furnace wall comprising the combination of a hollow casing adapted for being positioned in the aperture, an electrode extending through the casing into the furnace, an electrode supporting collar in said casing slidably supporting said electrode in spaced relation to the inside walls of said casing, a cooling jacket in said casing surrounding said electrode having an outer wall and end members for maintaining a cooling fluid in direct contact with the electrode, said jacket end members having apertures proportioned for sliding engagement with the electrode, and means for passing a cooling fluid through said jacket.

2. The assembly as claimed in claim 1 which further comprises means at the outer end of said casing for supporting said electrode including means for passing fluid out of said casing.

3. The assembly as claimed in claim 1 in which said circulating means comprises a fluid outlet in said jacket positioned above the bottom of said electrode.

4. The assembly as claimed in claim 1 in which said jacket has a fluid pressure relief outlet in its upper portion.

5. The assembly as claimed in claim 1 in which said jacket includes spacing means for spacing the inner jacket end collar from the electrode supporting collar.

6. A removable electrode cooling jacket for a wall mounted furnace electrode adapted for being slidably mounted surrounding the electrode and within an outer casing and outwardly of an electrode supporting collar comprising the combination of a relatively thin outer tube member proportioned to extend axially along the electrode in spaced relation thereto, an end collar member on each end of said tube having an aperture for slidably receiving the electrode, said end collar members being spaced inwardly from the ends of said tube, a spacing member at one end of said tube for spacing the tube axially from said electrode supporting collar, a pair of spaced fluid ports in the end collar at said opposite end of said tube, and a pressure relief port in one of said members.

References Cited

UNITED STATES PATENTS

| | | | |
|---|---|---|---|
| 1,542,716 | 6/1925 | Payne | 13—15 |
| 2,693,498 | 11/1954 | Penberthy | 13—6 X |
| 2,736,759 | 2/1956 | Penberthy | 13—6 X |
| 2,802,041 | 8/1957 | Bramlett et al. | 13—6 X |
| 2,908,738 | 10/1959 | Rough | 13—6 X |

BERNARD A. GILHEANY, *Primary Examiner.*

H. B. GILSON, *Assistant Examiner.*